3,005,774
LUBRICANTS CONTAINING CROSS-LINKED POLYMERS AS THICKENING AGENTS
James E. Shewmaker, Fanwood, Eric O. Forster, Scotch Plains, Arnold J. Morway, Clark, and Jerome Panzer, Rahway, N.J., assignors to Esso Research and Engineering Company, a corporation of Delaware
No Drawing. Filed July 29, 1957, Ser. No. 674,574
10 Claims. (Cl. 252—39)

This invention relates to lubricating oil compositions containing cross-linked polymeric materials. Particularly, it relates to lubricating fluids and greases containing high molecular weight cross-linked polymers and certain metal salts.

Cross-linked hydrocarbon polymers may be incorporated into lubricating oil as thickeners to form high dropping point greases which exhibit little change in consistency upon temperature changes. However, such greases have poor structural stability and readily break down upon working. It has been found that by incorporating minor amounts of certain metal salts into such greases, that excellent structurally-stable greases may be formed which have high dropping points and good extreme pressure and anti-wear characteristics. By incorporating into the lubricating oil, smaller proportions of the cross-linked polymer along with the metal salt, excellent lubricating fluids may be formed which have good extreme pressure and anti-wear properties.

The cross-linked polymer may be formed by exposure to ionizing radiation of any hydrocarbon polymers of 100 to 1,000,000, e.g. 500 to 500,000 molecular weight provided the polymer does not degrade too rapidly under radiation. Operable materials will include polymers of $C_2$ to $C_{20}$, e.g. $C_2$ to $C_{10}$ aliphatic or cyclic mono- or diolefins, polymers of aromatic hydrocarbons, as well as various copolymers of any said materials. Examples of such polymers include homopolymers such as: polyethylene, polypropylene, polyisobutylene, polybutene-1, polystyrene, polydivinyl benzene, polyallyl benzenes, polycyclopentadiene, polybutadiene, polyisoprene, polypiperylene, etc. and copolymers such as: vinyl and allyl aromatics, vinyl ethers and acrylates, styrene and butadiene, etc. One inexpensive source of polymeric materials which can be used are the petroleum resins which have melting points of about 150 to 350° F. and are prepared from mixtures of diolefins and olefins. These materials are well known in the art and are generally prepared by $AlCl_3$ polymerization of steam-cracked petroleum naphthas as described in U.S. Patent 2,734,046. Such resins are commercially available under the trade name "Piccopale."

While the hydrocarbon polymeric material may be cross-linked solely by means of ionizing radiation, in other cases it is desirable to use an aromatic divinyl cross-linking agent in order to increase both the rate and extent of cross-linking. In the case of some of the materials included above, such as polyisobutylene, polymethylmethacrylates, isobutylene copolymers and the like, which tend to depolymerize under ionizing radiation, a cross-linking agent can be used to good advantage to facilitate cross-linking without undue breakage of the main polymer chains.

The cross-linking agents which have been found particularly effective are those possessing at least two double bonds, such as materials of the divinyl aromatic type. These materials have the general formula:

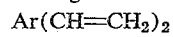

wherein Ar is an aryl group including unsubstituted aryl groups such as phenyl, biphenyl, naphthyl, and alkyl substituted aryl groups, such as those substituted with about 1 to 3 alkyl radicals containing 1 to 20, e.g. 1 to 6 carbon atoms per alkyl group. Examples of such compounds include divinyl benzene, divinyl toluene, divinyl xylene, divinyl naphthalene, etc. Surprisingly, it has been found that other similar materials, even well known chemical cross-linking agents, do not give the same results as the aromatic divinyl type of cross-linking agents. For example, divinyl sulfide, ethylene glycol divinyl ether, diallyl phthalate, diallyl amine, diallyl ether and diallyl sulfide will not cross-link petroleum resin under ionizing radiation.

The cross-linking of the polymeric hydrocarbon material may be carried out by dissolving or suspending about 1 to 90, e.g. 5 to 75 weight percent of the polymer to be cross-linked in a solvent relatively inert to radiation. Preferred solvents are n-heptane, cyclohexane, benzene and their various homologs; saturated or predominately aromatic petroleum distillates boiling below 150° C.; or the various halogenated hydrocarbons, ethers, ketones, etc. or other solvents showing little or no reaction in the presence of radiation. If the cross-linking agent is used, then preferably from about 1 to 25, e.g. 2 to 20 weight percent of the aromatic divinyl compound (based on the polymer) is also dissolved in the solvent. This solution is then subjected to high energy ionizing radiation until the optimum extent of cross-linking for the particular polymer is attained. However, the solvent is not essential as the polymer, with or without the cross-linking agent, may be dissolved, swollen or suspended in oil used to make the lubricant and then irradiated; or the polymer may be swollen with the cross-linking agent and then irradiated; or the polymer per se may be irradiated in bulk; or the cross-linking agent may be milled into the polymer or mixed into the melted polymer and then irradiated, etc.

The radiation will be high energy ionizing radiation from terrestrial sources consisting of: photons having a wave length less than 50 A., such as gamma and X-rays; rapidly moving charged or uncharged particles of an atomic or subatomic nature having an energy above 30 e.v., such as beta rays and neutrons; of sufficient intensity such that the dose rate is at least 100 equivalent roentgens per hour. This excludes radiation such as cosmic and ultraviolet.

The radiation can be obtained from artificial accelerators, charged particle accelerators such as Van de Graaff generators, X-ray machines, etc.; from nuclear reactors such as atomic piles; from waste from nuclear reactors such as spent fuel elements or portions thereof; and from materials or radioisotopes especially made radioactive in a nuclear reactor, such as Cobalt 60. The use of radioisotopes or accelerators is preferred, and it is also preferred that the radiation consist essentially of gamma or beta rays, i.e., be free from neutrons, because of safety and convenience.

It is desirable (but not necessary) that the dose rate be above at least 0.01 equivalent megaroentgens per hour, and that the total dosage will generally be about 0.5 to 75 megaroentgens, e.g. 1 to 50 megaroentgens. The materials to be polymerized can be exposed to the radiation source in any convenient manner. If a radioisotope is used, the material can be placed near the radioisotope in a batchwise manner, or simply flowed in, through, or around the isotope in suitable conduits. The radiation may be carried out at temperatures of about 50 to 400° F., e.g. 78 to 350° F., with or without stirring.

After the cross-linking reaction is carried out, the solvent (if used) may be distilled to leave the cross-linked polymer as a residue. The cross-linked polymer may then be pulverized in conventional plastic working material and stirred into the oil. When the reaction is carried out in situ in a portion or all of the lubricating oil used in the final lubricating composition, the necessity for distilling solvents is removed.

The lubricating compositions of the invention will comprise a major proportion of a lubricating oil containing about 0.1 to 40, e.g. 0.5 to 20, weight percent of the cross-linked polymer, and about 3 to 40, e.g. 5 to 30 weight percent of metal salt, said weight percents being based on the total weight of the composition. Most greases will contain about 0.5 to 10 weight percent polymer and 3 to 20 weight percent salt, while the lubricating fluids or semi-fluids will usually contain about 0.25 to 3.0 weight percent polymer and 3 to 20 weight percent salt.

The metal salts which are used include alkali metal (e.g. lithium and sodium) and alkaline earth metal (e.g. calcium, strontium, and barium) salts of $C_2$ to $C_5$ fatty acids (e.g. acetic propionic, furoic acids, etc.) or of inorganic mineral acids (e.g. nitric and phosphoric acid). Specific examples of such salts include: calcium acetate, trisodium phosphate, disodium acid phosphate, sodium nitrate, sodium nitrite, calcium carbonate, etc.

The lubricating oil may be either a mineral lubricating oil or a synthetic lubricating oil. Examples of the latter include esters of monobasic acids (e.g. $C_8$ Oxo alcohol ester of $C_8$ Oxo acid); esters of dibasic acids (e.g. di-2-ethyl hexyl sebacate); esters of glycols (e.g. $C_{13}$ Oxo acid diester of tetraethylene glycol); esters of phosphoric acid (e.g. the ester formed by contacting three moles of the monomethyl ether of ethylene glycol with one mole of phosphorus oxychloride); halocarbon oils, alkyl silicates, sulfite esters, mercaptans, polyglycol type synthetic oils, etc.

Various other additives or thickening agents may also be incorporated in the lubricating composition in amounts of 0.001 to 15 weight percent. For example, detergents such as calcium petroleum sulfonate; oxidation inhibitors such as phenyl alpha naphthylamine; viscosity index improvers such as polyisobutylene; corrosion inhibitors, such as sorbitan monooleate; pour depressants; dyes; other grease thickeners and the like may be used. The presence of dispersing agents are particularly desirable in those instances where the salt has a tendency to settle out of the composition. Dispersing agents which have been found particularly suitable are of the following types:

Alkylolamides of fatty acids having the general formula:

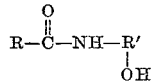

wherein R is a $C_8$ to $C_{20}$ alkyl group, and R' is a $C_2$ to $C_9$ alkyl group with the hydroxyl group attached to any one of the carbon atoms of R'. A specific example of such materials is

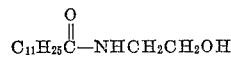

Alkylphenoxy polyoxyethylene alcohols and ethers of the general formula:

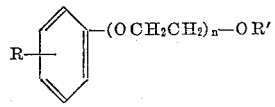

wherein R is hydrogen or a $C_1$ to $C_{12}$ alkyl group, $n$ is about 1 to 30, and R' is hydrogen or R. A specific example of such materials is

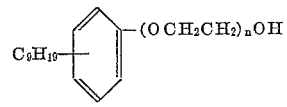

wherein $n$ averages 1.5, which is sold under the trade name Igepol CO-210.

Other dispersing agents such as sorbitan mono- and polyoleates, polyamine condensates of fatty acids, and quaternary halides of amines, etc. may be used. In sum, any dispersing agent may be used provided it effectively maintains the salt suitably dispersed in the composition. These dispersing agents when used, will be generally added in amounts of 0.001 to 5 weight percent, e.g. 0.1 to 3 weight percent based on the weight of the total composition.

The lubricating compositions are readily prepared by adding the desired amount of cross-linked material to the lubricating oil and dispersing the thickener by stirring or milling at temperatures ranging from 50 to 200° F., with 75 to 150° F. being prepared. The metal salt and a dispersing agent, if any, may be added along with the cross-linked polymer. The metal salt may also be formed in situ by adding metal base (e.g. hydroxide) and the desired acid along with the cross-linked polymer. This mixture is then heated to drive off the water. After heating, the lubricant is allowed to cool and may be homogenized, or cut back with more lubricating oil if desired.

The invention will be further understood by the following examples.

EXAMPLE I-A

*Preparation of the cross-linked polymer*

92 weight percent of powdered polyethylene of 750,000 M.W. (molecular weight) was slurried with about six times its weight of n-heptane. The slurry was then mixed with 8 weight percent of a commercial divinyl benzene. The commercial divinyl benzene consisted of about 50 weight percent solution of an isomeric mixture of divinyl benzene in diethylbenzene and monoethyl vinyl benzene and had a density of 0.900 and a bromine number of 170 and was prepared by dehydrogenation of diethylbenzene. The resulting mixture of polyethylene, n-heptane and commercial divinyl benzene while at room temperature was then subjected to radiation from a Cobalt 60 source at an intensity of one million roentgens per hour, for a total dose of 40 megaroentgens. The n-heptane was then evaporated and the cross-linked residue was used to prepare a grease.

*Preparation of grease*

3 weight percent of the residue as prepared above was added to 71 weight percent of a mineral lubricating oil (80 SUS at 210° F.) along with 15 weight percent of acetic acid, 10 weight percent of hydrated lime and 1 weight percent of Nopcogen 12–L (lauric alkylolamide). The mixture was heated to about 350° F. for about 30 minutes in order to form the salt, disperse the polymer and to dehydrate the mixture. The mixture was cooled to about 250° F. and 1 weight percent of phenyl alpha naphthylamine was stirred in. The grease was then cooled to room temperature and inspected.

EXAMPLE I-B

A grease was prepared exactly as in I–A except that 71 weight percent of the mineral oil was used, and no Nopcogen 12–L was added.

EXAMPLE I-C

A grease was prepared exactly as in I–A except that the polyethylene-divinyl benzene-heptane mixture was not irradiated.

EXAMPLE I-D

A grease was prepared exactly as in I–A except that no divinyl benzene was used, i.e. only the heptane-polyethylene slurry was irradiated.

EXAMPLE I-E

A grease was prepared exactly as in I–A except that polyethylene per se (i.e. without heptane, divinyl benzene or irradiation) was used.

EXAMPLE II-A

A grease was prepared exactly as in I–A except that finely powdered polypropylene of 150,000 molecular weight was used instead of polyethylene.

EXAMPLE II-B

A grease was prepared exactly as in II-A except that the polypropylene per se was used as the thickener, i.e. no divinyl benzene, no heptane and no irradiation.

EXAMPLE III

A cross-linked polymer was prepared by irradiating a mixture consisting only of 90 weight percent polyisobutylene of 780 molecular weight and 10 weight percent commercial divinyl benzene for a total of 7.2 megaroentgens, using the Cobalt 60 source of Example I-A. This cross-linked polymer was then used to prepare a grease according to the method of I-A but for different proportions of ingredients.

EXAMPLE IV

A cross-linked polymer was prepared by irradiating with Cobalt 60 a mixture consisting only of 89 weight percent of a polybutadiene-1,3 oil of 4 poise viscosity at 77° F., and 11 weight percent of the commercial divinyl benzene for a total dose of 22 megaroentgens. A grease was prepared from the resulting material according to the method of preparing the grease of Example I-A except that different proportions were used and no phenyl alpha naphthylamine was used.

room temperature while irradiated by the Cobalt 60 source for a total dosage of 5.6 megaroentgens.

A grease was then prepared as follows:

5.4 parts by weight of the total reaction product prepared as above, 18.0 parts by weight of acetic acid, 12.6 parts by weight of hydrated lime and 0.8 part by weight of Nopcogen 12-L was dispersed in 63.2 parts by weight of a mineral lubricating oil having a viscosity of 80 SUS at 212° F. The entire mixture was heated to a temperature of 250° F. over a period of 30 minutes and maintained at this temperature for 2 hours and then cooled.

EXAMPLE V-B

A fluid lubricant was prepared from the cross-linked polymeric material of Example V-A as follows:

A concentrate was first made by mixing 5.0 weight percent of the cross-linked polymeric containing material of V-A (i.e. the Piccopale 100-divinyl benzene-mineral oil), 15 weight percent glacial acetic acid, 10 weight percent hydrated lime, 1 weight percent Nopcogen 12-L and 69 weight percent of a mineral oil of 80 SUS at 210° F. This mixture was heated to 350° F. to produce a dehydrated dispersion and then cooled. 33 weight percent of the concentrate was then mixed with 67 weight percent of a mineral lubricating oil of 55 SUS at 210° F. to produce the final fluid thixotropic product.

The compositions and properties of the above lubricants are summarized in the following tables.

TABLE I.—LUBRICANTS CONTAINING POLYMERIC THICKENERS AND CALCIUM ACETATE

|  | I-A | I-B | I-C | I-D | I-E | II-A | II-B | III | IV | V-A | V-B |
|---|---|---|---|---|---|---|---|---|---|---|---|
| Polymeric Thickener Composition (Wt. Percent): | | | | | | | | | | | |
| Piccopale 100 [1] (M.W. 1,100) | | | | | | | | | | 19 | 19 |
| Polyethylene (M.W. 750,000) | 92 | 92 | 92 | 100 | 100 | | | | | | |
| Polypropylene (M.W. 150,000) | | | | | | 92 | 100 | | | | |
| Polyisobutylene (M.W. 780) | | | | | | | | 90 | | | |
| Polybutadiene-1,3 (4 Poise) | | | | | | | | | 89 | | |
| Divinyl Benzene (Commercial) | 8 | 8 | 8 | | | 8 | | 10 | 11 | 5 | 5 |
| Mineral Lubricating Oil (55 SUS at 210° F.) | | | | | | | | | | 76 | 76 |
| Radiation Dosage, Megaroentgen | 40 | 40 | None | 46 | None | 40 | None | 7.2 | 22 | 5.6 | 5.6 |
| Lubricant Composition (Wt. Percent): | | | | | | | | | | | |
| Polymeric Thickener (from above) | 3 | 3 | 3 | 3 | 3 | 3 | 3 | 10 | 5 | 5.4 | 1.67 |
| Acetic Acid (Glacial) | 15 | 15 | 15 | 15 | 15 | 15 | 15 | 15 | 15 | 18.0 | 5.00 |
| Hydrated Lime | 10 | 10 | 10 | 10 | 10 | 10 | 10 | 10 | 10 | 12.6 | 3.33 |
| Nopcogen 12-L [2] | 1 | | 1 | 1 | 1 | 1 | 1 | 1 | 1 | 0.8 | 0.33 |
| Phenyl Alpha Naphthylamine | 1 | 1 | 1 | 1 | 1 | 1 | 1 | 1 | | | |
| Mineral Lubricating Oil (80 SUS at 210° F.) | 70 | 71 | 70 | 70 | 70 | 70 | 70 | 63 | 70 | 63.2 | 22.67 |
| Mineral Lubricating Oil (55 SUS at 210° F.) | | | | | | | | | | | 67.0 |

[1] Petroleum resin having a softening point of 100 C.
[2] Lauryl alkylolamide.

TABLE II.—PROPERTIES

|  | I-A | I-B | I-C | I-D | I-E | II-A | II-B | III | IV | V-A | V-B [1] |
|---|---|---|---|---|---|---|---|---|---|---|---|
| Micropenetration mm./10 at 77° F.: | | | | | | | | | | | |
| Unworked | 65 | 301 | 35 | 49 | 55 | 70 | [2] 15 | 142 | 81 | 83 | |
| Worked 10 Strokes | | | | | | | | | 103 | | |
| Worked 20 Strokes | 108 | [3] +400 | 52 | 70 | 103 | 116 | 15 | 219 | | 158 | |
| Dropping Point, °F | | | | | +500 | | | | | | |
| Shell Four-Ball Test (1,800 r.p.m., 1 hr., 75° C., 10 kg.) | | | | | | | | | | | |
| Wear Scar Diam., mm | 0.19 | 0.35 | 0.47 | 0.25 | 0.42 | 0.25 | 0.46 | 0.40 | 0.36 | 0.41 | 0.29 |

[1] Thixotropic fluid.
[2] Semi-fluid.
[3] Rubbery.

EXAMPLE V-A

A cross-linked polymer was prepared from a petroleum resin having a softening point of about 100° C. and available under the trade name of Piccopale 100. This resin was prepared by Friedel-Crafts' polymerization of mono- and diolefins obtained from steam-cracked petroleum naphtha and has an average molecular weight of about 1100. The cross-linked material was prepared as follows:

19 weight percent of Piccopale 100 was dissolved in 76 weight percent of a naphthenic mineral oil of 55 SUS at 210° F. by heating to 250° F. while stirring. After cooling, 5 weight percent of commercial divinyl benzene was added and the solution was maintained at about Comparison of Examples I-A, I-B, and I-D with Examples I-C and I-E show the improvement in the anti-wear characteristics of the lubricant when the cross-linked polyethylene is used rather than the linear polyethylene. Examples I-A and I-B further show that the dispersing agent of I-A resulted in a harder grease due to more efficient use of the thicker, while Example I-D shows the formation of the cross-linked polymer without the use of a cross-linking agent.

Comparison of Examples II-A and II-B show the improvement in wear ability of cross-linked polypropylene over the corresponding linear polymer. Examples III, IV and V-A show the use of cross-linked polyisobutylene, polybutadiene-, and petroleum resin respectively and of smaller dosages of radiation, while Example V-B illustrates a fluid type lubricant.

As seen from the above examples, excellent lubricating greases having high dropping points and good anti-wear properties may be prepared from the cross-linked polymer and metal salt. Compositions containing the cross-linked polymers of $C_2$ to $C_5$ aliphatic alpha mono-olefins are particularly preferred because of their very good wear properties.

To further illustrate the invention other lubricating compositions can be prepared as follows:

20 parts by weight of the cross-linked polymer residue of Example I-A, 30 parts by weight of trisodium phosphate and 3 parts by weight of Igepol CO-210 may be dispersed in 47 parts by weight of mineral lubricating oil (80 SUS at 210° F.) by heating while stirring to a temperature of about 200° F., followed by cooling to form a grease. As an example of yet another composition which can be prepared, the preceding preparation may be repeated, only using disodium phosphate in place of the trisodium phosphate and using as a dispersing agent an alkylolamide of the formula:

in place of the Igepol CO-210.

What is claimed is:

1. A soap-free lubricating composition consisting essentially of lubricating oil, about 0.1 to 40 weight percent of a cross-linked hydrocarbon polymer formed by irradiating with in the range of 0.5 to 75 megaroentgens of high energy ionizing radiation a $C_2$ to $C_{20}$ olefin polymer having an original molecular weight in the range of $10^2$ to $10^6$, and about 3 to 40 weight percent of a metal salt selected from the group consisting of alkaline earth metal salts of $C_2$ to $C_5$ fatty acids, trisodium phosphate and disodium acid phosphate.

2. A lubricating composition according to claim 1, wherein said lubricating oil is a mineral oil.

3. A lubricating composition according to claim 1, wherein said lubricant also contains about 0.1 to 3.0 weight percent of a dispersing agent selected from the group consisting of A. Alkylolamides of fatty acids having the general formula:

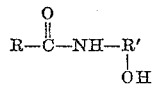

wherein R is a $C_8$ to $C_{20}$ alkyl group and R' is a $C_2$ to $C_9$ alkyl group with the hydroxyl group attached to any of the carbon atoms of R';

B. Alkylphenoxy polyoxyethylene alcohols and ethers of the general formula:

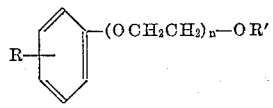

wherein R is selected from the group consisting of hydrogen and $C_1$ to $C_{12}$ alkyl groups, $n$ is about 1 to 30 and R' is selected from the group consisting of hydrogen and R.

4. A lubricating composition according to claim 1, wherein said salt is calcium acetate.

5. A lubricating composition according to claim 1, wherein said cross-linked polymer is prepared by cross-linking a linear polymer of a $C_2$ to $C_{10}$ alpha mono-olefin in the presence of about 1 to 25 weight percent, based on the weight of linear polymer, by an aryl divinyl cross linking material having the formula $A_R(CH=CH_2)_2$, wherein $A_R$ is an aryl group, by an irradiation dose of 1 to 50 megaroentgens.

6. A lubricating composition according to claim 5, wherein said aryl divinyl material is divinyl benzene.

7. A soap-free lubricating composition consisting essentially of mineral lubricating oil, about 0.5 to 20.0 weight percent of a cross-linked $C_2$ to $C_5$ aliphatic alpha mono-olefin polymer originally having a molecular weight in the range of $10^2$ to $10^6$ and that has been irradiated with in the range of 1 to 50 megaroentgens of high energy ionizing radiation, and about 5.0 to 30.0 weight percent of calcium acetate as the sole metal salt of a fatty acid.

8. A lubricating composition according to claim 7, wherein said lubricant also contains about 0.1 to 3.0 weight percent of a dispersing agent selected from the group consisting of A. Alkylolamides of fatty acids having the general formula:

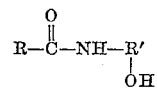

wherein R is a $C_8$ to $C_{20}$ alkyl group and R' is a $C_2$ to $C_9$ alkyl group with the hydroxyl attached to any of the carbon atoms of R';

B. Alkylphenoxy polyoxyethylene alcohols and ethers of the general formula:

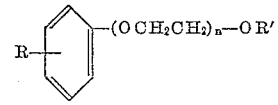

wherein R is selected from the group consisting of hydrogen and $C_1$ to $C_{12}$ alkyl groups, $n$ is about 1 to 30 and R' is selected from the group consisting of hydrogen and R.

9. A method of preparing a soap-free lubricant comprising a major proportion lubricating oil, 0.1 to 40 weight percent of a cross-linked hydrocarbon polymer prepared by cross-linking a polymer of a $C_2$ to $C_{20}$ aliphatic olefin having a molecular weight of $10^2$ to $10^6$ by exposure to 1 to 50 megaroentgens of high energy ionizing radiation, and 3.0 to 40.0 weight percent of calcium acetate, said method comprising mixing said cross-linked hydrocarbon polymer, acetic acid and a calcium base into said oil, followed by heating to form said calcium acetate and to dehydrate the mixture to thereby form said lubricant and wherein said calcium acetate is the sole metal salt of a fatty acid present in said composition.

10. A method according to claim 9, wherein said calcium base is calcium hydroxide.

References Cited in the file of this patent

UNITED STATES PATENTS

| | | |
|---|---|---|
| 2,079,051 | Sullivan et al. | Mar. 15, 1933 |
| 2,744,870 | Stillebroer et al. | May 8, 1956 |
| 2,796,401 | Matuszak et al. | June 18, 1957 |
| 2,810,695 | Young et al. | Oct. 22, 1957 |
| 2,863,847 | Morway | Dec. 9, 1958 |

OTHER REFERENCES

Handbook of Material Trade Names, Zimmerman and Lavine, Industrial Research Service Inc., Dover, N.H., 1953 ed., page 402.

Handbook of Material Trade Names (Supplement I), Zimmerman and Lavine, Industrial Research Service, Inc., Dover, N.H., 1956, page 108.